Patented Oct. 28, 1930

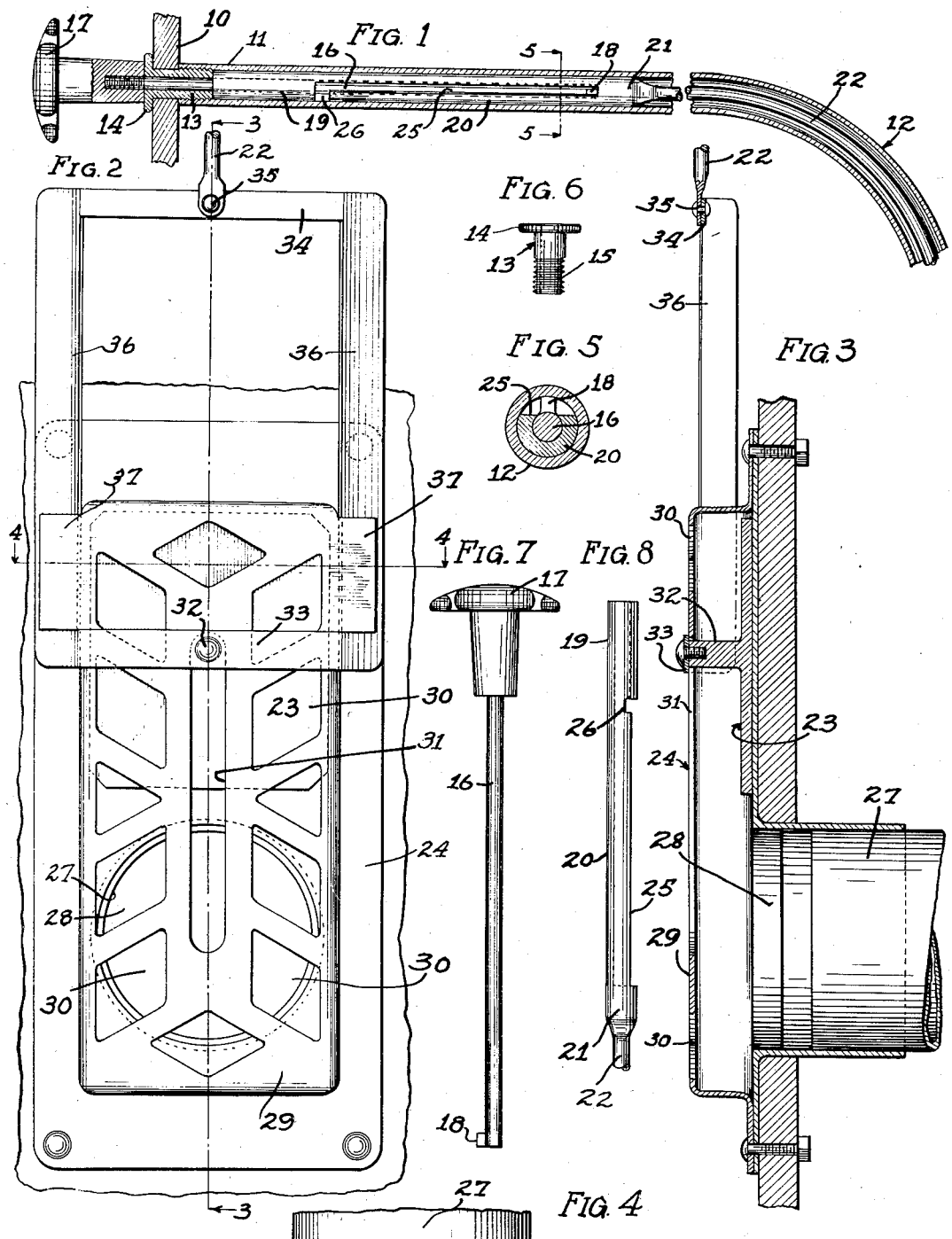

1,779,472

UNITED STATES PATENT OFFICE

HANS H. IMINGEN, OF MOSINEE, WISCONSIN

CONTROL DEVICE FOR AUTOMOBILE HEATERS

Application filed September 21, 1929. Serial No. 394,190.

This invention relates to controlling devices, and more particularly to a device for operating the valve which controls the outlet of an automobile heater, or for operating the movable parts for controlling and regulating other utilities on an automobile or the like. Usually, the controlling devices for the various utilities on an automobile are located on the dashboard or a specially provided instrument board adjacent to the dashboard so as to be within convenient reach of the driver of the car, said controlling devices being more commonly of the push and pull type and being connected to the respective utilities by a flexible reciprocatory rod which is guided in a tubular support, and are generally termed Bowden wires. Obviously, these push and pull devices are usually provided with knobs or other convenient handle elements at their outer ends, which are located in close proximity to the face of the instrument board or dashboard, as the case may be, in the closed position of the heater valve or other utility controlled thereby, and in the opened position of said parts the respective knobs or handle elements are projected some distance from the face of the instrument board or dashboard.

The present invention has for its principal object to provide a reciprocatory or push and pull type of controlling device having provision whereby the manipulating knob or handle member may be readily withdrawn to operate the heater valve or movable element of the particular utility to which the device is connected, in the one direction, and whereby said knob or handle element may be afterwards returned to its normal position, in close proximity to the instrument board or dashboard, without disturbing the heater valve or other member which has just been operated, but said device having further provision for reversely operating the heater valve or other member upon the return of the knob or handle element, at the will of the operator. The invention has for its other objects to improve generally upon devices of this character, and to attain certain advantages as will hereinafter more fully appear. The invention consists in the novel construction and in the parts and combinations and arrangements of parts hereinafter described and pointed out with particularity in the appended claims.

In the accompanying drawings, forming part of this specification, and illustrating a practical adaptation of the invention,—

Fig. 1 is a view, in longitudinal section, of the outer end portion of the Bowden wire, showing the attached controlling device in its outwardly operated position and the manipulating knob returned to its normal position with respect to the instrument board or dashboard;

Fig. 2 is a fragmentary view, showing the heater in top plan and the outlet valve moved to opened position;

Fig. 3 is a section taken substantially on the line 3—3 of Fig. 2;

Fig. 4 is a section on or about the line 4—4 of Fig. 2;

Fig. 5 is a cross-section, taken on or about the line 5—5 of Fig. 1;

Fig. 6 is a detail view of the bushing for the outer end of the guide tube detached;

Fig. 7 is a side elevation of the manipulating knob or handle member detached; and Fig. 8 is a view of the reciprocatory controlling member which cooperates with the knob or handle member.

Referring now to the drawings, the numeral 10 designates the instrument board or dashboard of an automobile or the like, to which is attached the outer end portion 11 of a guide tube 12, the attachment between said board 10 and end portion 11 of the tube 12 being effected through the instrumentality of a bushing 13, having a retaining collar 14 at its outer end, and preferably having its inner end portion externally screw-threaded, as at 15, so as to engage counterpart threads provided therefor in the end portion 11 of said tube 12.

Slidable in the bore of said bushing 13 is the stem portion 16 of a manipulating knob 17, the stem 16 having a lateral lug 18 at its end for the purpose which will be presently described.

The stem portion 16 of the knob 17 is slidably fitted to the bore in the tubular portion 19 of a reciprocatory member 20, which is slidably fitted in the guide tube 12. Said member 20 is attached at its end portion 21 to a heavy wire 22, which slides in the tube 12 and is in turn connected to the valve member 23 of the heater 24, or to the movable actuating member of any other utility it is desired to operate. The reciprocatory member 20 is sliced, as at 25, between its tubular end portion 19 and opposite end portion 21 to which the wire 22 is attached, this slicing or cutting away of the member 20 providing a longitudinal channel in the member 20 having, in effect, undercut side walls in which the stem portion 16 of the knob 17 is free to slide longitudinally and rotatably, yet is held against lateral displacement, owing to the slight overhang of the side walls. The latteral lug 18 at the inner end of the stem 16 of said knob element 17 is slidable freely in the restricted longitudinal opening with a key effect, so as to prevent rotation of the stem 16 until said lug 18 comes within range of the laterally extending notch 26 at the end of said slotted portion 25 adjacent to the tubular portion 19 of said member 20.

In practice, the heater 24 may be mounted on the dashboard, footboard or floorboard of the car, as may be desired. As shown, the heater is of the hot air type, the air being supplied through a pipe 27 which registers with an opening 28 provided therefor in the board on which the heater is mounted, said opening being controlled by the valve member 23, which latter, as shown, is of the slidable plate type and works in a housing 29 whose top wall is provided with suitable openings 30 for the passage of the heated air therethrough. The housing 29 is also provided with a longitudinal slot 31 in which a stud 32 on the valve member 23 works. This stud 32 has one end portion 33 of an actuator frame attached thereto, the opposite end portion 34 of said frame being attached, as at 35, to the end of the wire 22. The two opposite side members 36 of said actuator frame are turned angularly, as best shown in Fig. 4 of the drawings, so as to overhang the adjacent side portions of the housing 29, whereby to guide said actuator frame when it is reciprocated longitudinally on the housing 29, said frame being further guided by providing lateral wings 37 extending from the sides of the housing 29 near one end thereof, as shown in Fig. 2 of the drawings.

When the heater is in operation the valve member 23 is in a position shown in the drawings, in which position the opening 28 is uncovered, permitting the passage of the heated air therethrough. Obviously, when the valve member 23 is moved to the opposite end of the housing 29 the opening 28 is closed, thereby shutting off the supply of heated air from the pipe 27. In the opened position of the valve 23, as shown, the member 20 is at the end portion 11 of the tube 12 and is in engagement with the inner end portion of the bushing 13. The member 20 is moved into this position by grasping the knob 17 and withdrawing the stem portion 16 with the lateral lug 18 thereon in engagement with the inner end of the tubular portion 19 of said member 20 and moving said member 20 outwardly until its outer end comes in contact with the inner end of said bushing 13, after which the knob may be moved to its normal position close to the instrument board or dashboard 10, as shown in Fig. 1 of the drawings, at which time said lug 18 is at the inner end of the slot 25 of said member 20.

When it is desired to close the valve member 23 of the heater, the stem 16 is withdrawn until said lug 18 at the end thereof comes in contact with the inner end of the tubular portion 19 of stem member 20 and is within range of the lateral slot 26, whereupon the knob 17 is rotated so as to turn said lug 18 into said notch 26, after which the knob is moved inwardly, and, owing to the lug 18 being engaged in said notch 26, the member 20 and, of course, the wire 22 attached thereto, are moved inwardly and the valve member 23 accordingly moves toward the end of the housing 29, where it covers the opening 28.

Obviously, the device may be used for operating various utilities other than the specific heater shown in the drawings, and may be modified structurally in many respects without departing from the spirit and scope of the invention as defined by the appended claims. The invention, therefore, is not limited to the specific construction and arrangement shown in the drawings.

Having thus described my invention, what I claim as new and desire to secure by Letters Patent is:

1. In a controlling device of the character described, a longitudinal reciprocatory member operably connected to a utility actuating member, and a normally closed actuator for said reciprocatory member, said actuator being capable of independent movement longitudinally and rotatably with respect to said reciprocatory member, whereby to be restored to normal closed position when said reciprocatory member is in its outer position.

2. In a controlling device of the character described, a longitudinal reciprocatory member operably connected to the actuating member of a utility, an actuator for said reciprocatory member comprising a knob having a stem slidable longitudinally and rotatably in said reciprocatory member, said reciprocatory member having a longitudinal slot which permits longitudinal movement of said actuator with respect to said reciprocatory member and prevents rotation of said actuator, and means for interlocking said reciprocatory member and said actuator member when said members are in their respective outermost positions.

3. In a controlling device of the character described, a guide tube, a longitudinally reciprocable member in said guide tube, a wire in said tube connected at one end to said reciprocatory member and at its opposite end to an actuating member of a utility, said reciprocatory member having a longitudinal bore in its outer end portion and a cooperating longitudinally slotted portion communicating with said tubular portion, a transverse notch communicating with said slotted portion adjacent to the inner end of said tubular portion, an actuator comprising a stem slidable in said reciprocatory member and having a lateral lug extending through the slot therein and being adapted to engage in said lateral slot, and a manipulating knob on the outer end of said stem.

4. The combination with an instrument board or the like, and a remote utility to be actuated, of a tubular guide member connected at one end to said instrument board and extending cooperatively into the region of said utility, a reciprocatory member slidable longitudinally in the outer end portion of said tubular guide member, a wire slidable in said guide member and being secured at one end to the inner end portion of said reciprocatory member and at its opposite end to an actuator member for said utility, said reciprocatory member being generally tubular throughout but being sliced for a portion of its length whereby to provide a tubular outer end portion and a cooperating longitudinal slot having substantially undercut side walls, said member having a transverse slot communicating with said longitudinal slot adjacent to the inner end of said tubular portion, a stem slidable longitudinally in said reciprocatory member and having a lateral lug at its inner end working in said longitudinal slot and being engageable in said transverse slot of said reciprocatory member, and a knob secured on the outer end of said stem.

5. In a controlling device for automobile heaters and other utilities, a reciprocatory member, a push and pull actuator for said reciprocatory member, said actuator being capable of independent longitudinal movement with respect to said reciprocatory member, and means for releasably interlocking said members when in their respective innermost and outermost positions.

6. The combination with a heater or other utility on an automobile or the like, and an instrument board within reach of the driver, of a guide tube connected at one end to said instrument board and extending with its opposite end in proximity to the utility to be actuated, a generally tubular member reciprocable longitudinally in the outer end portion of said guide tube and being connected at its inner end to the outer end of a wire slidable in said guide tube, the inner end of said wire being connected to an actuating member of said utility, said reciprocatory member being sliced longitudinally to provide a longitudinal slot having substantially undercut side walls and communicating at its outer end with a tubular forward end portion of said reciprocatory member, said reciprocatory member having a transverse slot at the end of the longitudinal slot adjacent to said forward tubular portion, means for manipulating said reciprocatory member comprising a stem slidable therein and having a lateral lug at its inner end working in said longitudinal slot and being adapted to engage in said transverse slot, and a knob on the outer end of said stem.

7. The combination with an automobile heater, of a valve for regulating the outflow from said heater, means for actuating said valve, including a Bowden wire device having means for reciprocating said wire and comprising a reciprocatory member and an actuator for said reciprocatory member, including a stem slidable longitudinally in said member and having provision for releasably interlocking therewith, both in their respective innermost and outermost positions.

In testimony whereof I have signed my name to this specification.

HANS H. IMINGEN.